United States Patent [19]
Allen

[11] Patent Number: 5,852,814
[45] Date of Patent: Dec. 22, 1998

[54] AUTONOMOUS LEARNING AND REASONING AGENT

[75] Inventor: Bradley P. Allen, Hermosa Beach, Calif.

[73] Assignee: Inference Corporation, Novato, Calif.

[21] Appl. No.: 763,005

[22] Filed: Dec. 10, 1996

Related U.S. Application Data

[62] Division of Ser. No. 518,850, Aug. 23, 1995, Pat. No. 5,586,218, which is a continuation of Ser. No. 869,926, Apr. 15, 1992, abandoned, which is a continuation-in-part of Ser. No. 664,561, Apr. 4, 1991, abandoned.

[51] Int. Cl.⁶ ........................................................ G06F 15/18
[52] U.S. Cl. .................................................. 706/13; 706/54
[58] Field of Search .............................. 395/13; 706/13, 706/54

[56] References Cited

PUBLICATIONS

F. Oppacher and D. Deugo, "Integrating Case–Based Reasoning with Genetic Algorithms," Proc. Int'l. Conf. Computational Intelligence, III, pp. 103–114, Sep. 1990.

*Primary Examiner*—Robert W. Downs
*Attorney, Agent, or Firm*—D'Alessandro & Ritchie

[57] ABSTRACT

A software agent which performs autonomous learning in a real-world environment, implemented in a case-based reasoning system and coupled to a sensor for gathering information from, and to an effector for manipulating, its environment. A case base which is tuned in response to an evaluation of how well the agent is operating in that environment. A memory of cases, the contents of that memory being determined by a genetic technique, including producing new cases which may never have been encountered in the environment, evaluating cases in response to a history of previous matches and in response to an external stimulus, and selecting a limited set of cases which provides a preferred model of the environment. A selection technique based on multiple measures, such as match quality, case accuracy, or case utility, which may induce experimentation by the autonomous agent, such as by employing a random or pseudorandom effect in selecting cases, and which may also distinguish between those actions which solve problems and those actions which gather further information so as to better solve problems. Multiple autonomous agents may form a collective entity and may cooperate to select an action to be performed by that collective entity.

1 Claim, 5 Drawing Sheets

Microfiche Appendix Included
(1 Microfiche, 35 Pages)

KNOBOTS IN DIAGNOSIS AND REPAIR

| GOALS | ELIMINATE NEED FOR USER INVOLVEMENT IN MAINTENANACE, ANTICIPATE FAILURES FOR PREVENTATIVE MAINTENANCE |
|---|---|
| STIMULI | DEVICE SENSOR READINGS, USER AND DEALER COMMANDS |
| ACTIONS | DEVICE DRIVER OUTPUTS, DIAGNOSTIC AND REPAIR MESSAGES |
| REINFORCEMENT | NEGATIVE IF DEVICE FAILS |
| BENEFITS | GREATLY INCREASED MEAN-TIME-BETWEEN-FAILURE |

*FIG.5*

KNOBOTS IN CUSTOMER SERVICE

| GOALS | RESPONSIVELY HANDLE CUSTOMER PHONE CALLS AND AUTOMATICALLY RESOLVE PROBLEM |
|---|---|
| STIMULI | TOUCH-TONE COMMANDS, VOICE RESPONSE UNIT MESSAGES |
| ACTIONS | VOICE RESPONSE OUTPUT, PBX TRANSFERS |
| REINFORCEMENT | POSITIVE IF DIALOG COMPLETED, NEGATIVE IF CALLER HANGS UP BEFORE PROBLEM RESOLUTION OR TRANSFER |
| BENEFITS | FOCUSED, RESPONSIVE USER INTERFACE THAT ADAPTS TO USER BEHAVIOR |

*FIG.6*

KNOBOTS IN KNOWLEDGE DISCOVERY

| GOALS | LEARN USEFUL KNOWLEDGE ABOUT PATTERNS IN DATA |
|---|---|
| STIMULI | DATABASE TABLES AND SCHEMA DEFINITIONS |
| ACTIONS | DATABASE QUERIES AND TRANSACTIONS |
| REINFORCEMENT | POSITIVE IF USEFUL INFORMATION DISCOVERED |
| BENEFITS | IMPROVED ABILITY TO GENERALIZE FROM DATA AND CAPTURE USEFUL REGULARITIES FOR COMPETITIVE ADVANTAGE |

*FIG.7*

AUTONOMOUS LEARNING AND REASONING AGENT

CROSS-REFERENCE TO RELATED APPLICATION

This is a division of patent application Ser. No. 08/518, 850, filed Aug. 23, 1995, now U.S. Pat. No. 5,586,218, which is a continuation of patent application Ser. No. 07/869,926, filed Apr. 15, 1992, now abandoned, which is a continuation in part of patent application Ser. No. 07/664, 561, filed Mar. 4, 1991, now abandoned.

REFERENCE TO MICROFICHE APPENDIX

This application contains a microfiche appendix A containing 1 microfiche and 35 frames.

BACKGROUND OF THE INVENTION

1. Field of the Invention

This invention relates to case-based reasoning and to a case-based reasoning system which performs autonomous learning in a real-world environment.

2. Description of Related Art

While computers are capable of tremendous processing power, their ability to use that processing power for reasoning about complex problems has so far been limited. Generally, before a computer can be used to address a complex problem, such as one which requires the attention of a human expert, it has been necessary to distill the knowledge of that expert into a set of inferential rules (a "rule base") which allow an automated processor to reason in a limited field of application. While this method has been effective in some cases, it has the natural drawback that it often requires a substantial amount of time and effort, by both computer software engineers and experts in the particular field of application, to produce a useful product.

Moreover, rule-based systems of this type present a difficult programming task. Unlike more prosaic programming tasks, constructing a rule base is sometimes counterintuitive, and may be beyond the ability of many application programmers. And once a rule-based system has been constructed based on the knowledge of a human expert, it may be difficult to accommodate changes in the field of operation in which the processor must operate. Such changes might comprise advances in knowledge about the application field, additional tasks which are intended for the processor, or changes in or discoveries about the scope of the application field.

One proposed method of the prior art is to build automated reasoning systems which operate by reference to a set of exemplar cases (a "case base"), to which the facts of a particular situation (the "problem") may be matched. The processor may then perform the same action for the problem as in the exemplar case. While this proposal has been well-received, case-based systems of this type may still require a substantial amount of human effort to identify exemplar cases and present a processor with sufficient information that cases may be matched and acted upon. For example, it may be necessary to deduce or supply extensive information about a complex environment so as to determine a preferred set of exemplar cases.

A related application, Ser. No. 08/247,630, filed May 23, 1994, now U.S. Pat. No. 5,581,664, which is a file wrapper continuation of a common parent application, Ser. No. 07/664,561, filed Mar. 4, 1991, discloses inventions in which a case-based reasoning system is smoothly integrated into a rule-based reasoning system, and in which an automated reasoning system may dynamically adapt a case base to problems which it encounters. An aspect of the inventions disclosed in that application also includes a technique in which a system may be set to work with a limited case base, and may solicit human advice for treatment of new problems which are not already well-treated by the case base, thus learning how to do its job on a dynamic basis.

Another application, Ser. No. 07/869,935, filed Apr. 15, 1992, now abandoned, discloses inventions in which a machine learning system may operate in conjunction with a relational database system, and particularly in which a machine learning system may operate in conjunction with a relational database system with an SQL interface. This allows the machine learning system to use high-speed searching power of computer systems which have been designed for use with relational database systems with an SQL interface, and allows the machine learning system to be smoothly integrated into computer systems which have relational databases, even if those databases were not designed to work with learning or reasoning systems of any kind.

It would be advantageous if an automated reasoning system could dynamically create its own case base in response to problems which it encounters, thus learning how to do its job on a dynamic basis and without substantial human intervention, or at least with only occasional human intervention. Limited intervention would allow an automated reasoning system to examine a larger set of cases and to determine a preferred set of exemplar cases without an external agent, such as a human operator, having to deduce or supply extensive information about a complex environment.

It would also be advantageous if an automated reasoning system could operate autonomously in a complex environment, possibly with external intervention such as positive or negative reinforcing stimuli. External stimuli might be in response to a result of the system's attempts to manipulate its environment, or might be provided by an external agent, such as a human operator. Accordingly, it is an object of the invention to provide an automated reasoning system which does not require intervention for every case.

SUMMARY OF THE INVENTION

The invention provides a software agent which performs autonomous learning in a real-world environment. The autonomous agent may learn by reinforcement (including positive and negative, and delayed and sporadic, reinforcement), in addition to learning by example and learning by being told what to do. In a preferred embodiment, the autonomous agent may be implemented in a case-based reasoning system, which may be coupled to a sensor for gathering information from, and to an effector for manipulating, its environment (which may comprise a software environment, a physical environment, or some combination thereof). In addition to gathering a case base of experience in its environment, the autonomous agent may tune that case base in response to an evaluation of how well it is operating in that environment. The evaluation may be its own, or may be in response to a stimulus such as a reward or punishment. In addition to taking action on a problem based on its case base, the autonomous agent may take action to gather information so as to determine which cases are most appropriate to that problem.

In a preferred embodiment, the autonomous agent may comprise a memory of cases, the contents of that memory being determined by a genetic technique for producing, evaluating and selecting cases. New cases may be produced by inspection of scenarios from the environment, by mutation of old cases, or by combining or selecting features from old cases; thus the memory may comprise cases the autonomous agent has never encountered in the environment. The stored cases may be evaluated in response to a history of previous matches and in response to an external stimulus, and weights (such as measures of accuracy and utility) may be associated with stored cases. The contents of the memory may be limited to a set of cases which provides a preferred model of the environment, such as those cases which have the better evaluations.

In a preferred embodiment, the autonomous agent may comprise a selection technique based on multiple factors, such as match quality, case accuracy, or case utility. The selection technique may also induce experimentation by the autonomous agent, such as by employing a random or pseudorandom effect in selecting cases. The selection technique may also distinguish between those actions which solve problems and those actions which gather further information so as to better solve problems. Multiple autonomous agents may form a collective entity and may cooperate to select an action to be performed by that collective entity.

DESCRIPTION OF THE PREFERRED EMBODIMENT

An embodiment of this invention may be used together with inventions which are disclosed in another application titled "MACHINE LEARNING WITH A RELATIONAL DATABASE", Ser. No. 07/869,935, filed Apr. 15, 1992 in the name of the same inventor, now abandoned, hereby incorporated by reference as if fully set forth herein.

Figure 1:
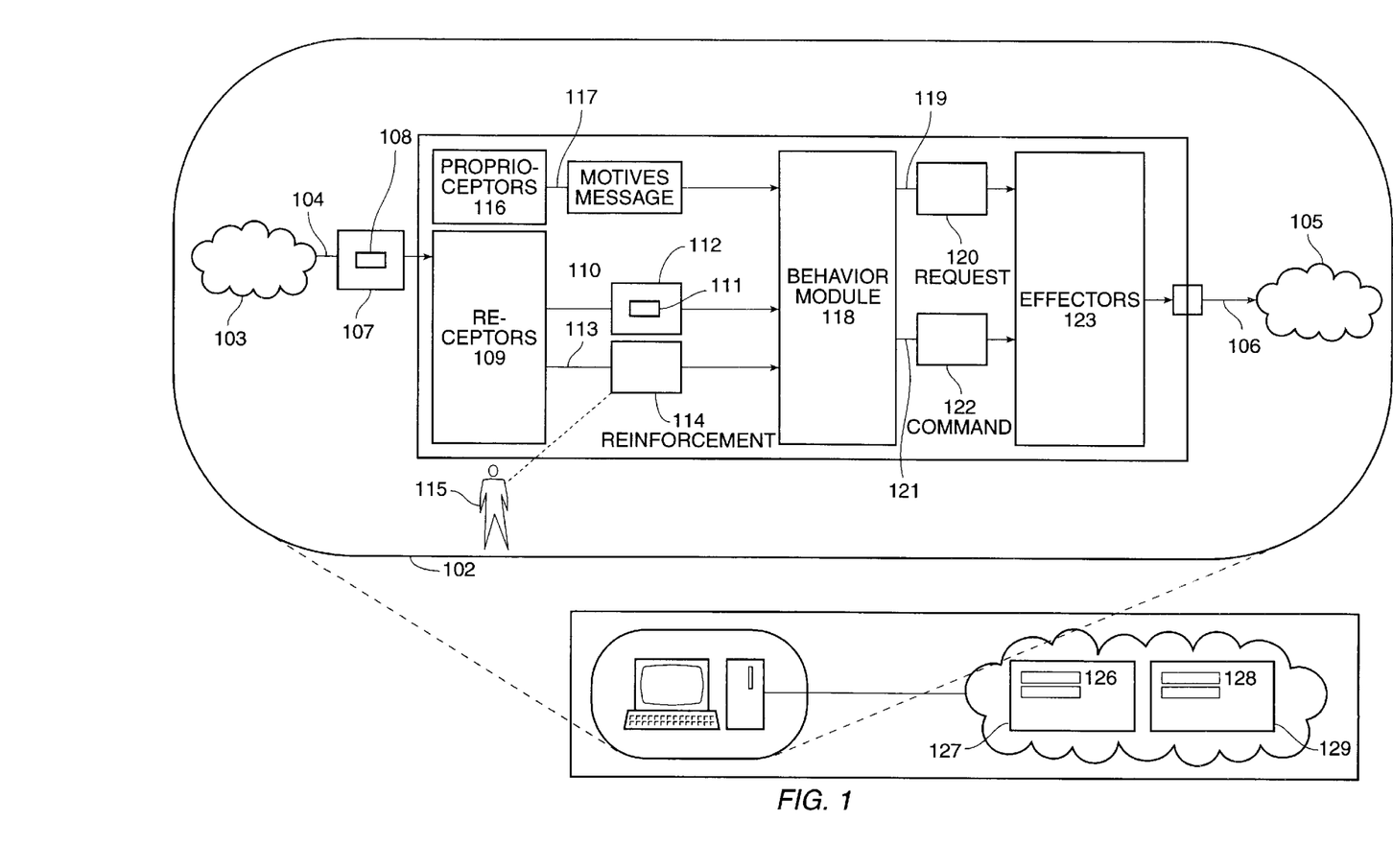
FIG. 1 shows a block diagram of an autonomous agent embedded in a complex environment.

FIG. 1 shows a block diagram of an autonomous agent embedded in a complex environment.

A software agent 101 may be embedded in an environment 102 so that the agent 101 may receive a stimulus 103 from the environment 102 by receiving a stimulus message 104, and may perform an action 105 which affects the environment 102 by sending an action message 106. In a preferred embodiment, the stimulus message 104 and the action message 106 may each comprise a manipulable software object 107 and may transmit that software object 107 from source to destination. Software objects 107 may comprise data elements 108 and relations to other software objects 107 as is well known in the art. Object-oriented systems are more fully described in "Object-Oriented Design With Applications" by Grady Brooch, published by Benjamin/Cummings Publishing, Redwood City, Calif. (1991), hereby incorporated by reference as if fully set forth herein.

In a preferred embodiment, the environment 102 may comprise either a software environment or a physical environment, or some combination thereof. For example, the environment 102 may comprise a physical room; the agent 101 may receive a LIGHTS stimulus message 104 telling if a set of lights in the room is off or on; and the agent 101 may send a LIGHTS-ON action message 106 to turn on the lights. Alternatively, the environment 102 may comprise a graphic database; the agent 101 may receive a PICTURE stimulus message 104 telling about a picture in the database; and the agent 101 may send an ADD-PROPERTY action message 106 to add a property value (e.g., "author= Vermeer") to the picture.

A set of receptors 109 may receive the stimulus message 104 and generate a features message 110. In a preferred embodiment, the receptors 109 may map a set of aspects or features 111 of the environment 102 (especially those relating to external stimuli) into a set of feature objects 112, which may comprise software objects 107 which describe the aspects or features 111 of the environment 102. For example, the environment 102 may comprise an oil refinery and the feature objects 112 may comprise temperature and pressure values at various positions in the refinery.

The set of receptors 109 may also generate a reward message 113, which may comprise a scalar-valued reinforcement 114 which measures what success the agent 101 is having with the environment 102. In a preferred embodiment, the value of the reinforcement 114 may be determined by the receptors 109, or may be externally supplied, such as from a human operator 115. For example, the environment 102 may comprise a loan portfolio database and the reinforcement 114 may measure loan performance, or the environment 102 may comprise a music audio database and the reinforcement 114 may be entered by the human operator 115 after listening to selections made by the agent 101.

A set of proprioceptors 116 may generate a motives message 117, which may comprise software objects 107 which describe goals or needs of the agent 101. In a preferred embodiment, the proprioceptors 116 may map aspects or features of the environment 102 (especially those relating to internal states of the agent 101 itself) into those goals or needs. The goals or needs of the agent 101 itself are thus a kind of feature 111 which the agent 101 may consider, and are similar to the features 111 which are reported by the receptors 109. For example, the environment 102 may comprise a piece of office equipment such as a photocopier and the motives message 117 may comprise internally generated features 111 such as the need for new ink or paper. The proprioceptors 116 may be altered by a designer so as to change the essential goals of the agent 101.

A behavior module 118 may receive the motives message 117, the features message 110 and the reward message 113, and may generate a queries message 119, which may comprise software objects 107 which describe a request 120 by the agent 101 for further information, and a commands message 121, which may comprise software objects 107 which describe a command 122 by the agent 101 to affect the environment 102. In a preferred embodiment, the behavior module 118 may comprise one like that disclosed with FIG. 2.

A set of effectors 123 may receive the queries message 119 and the commands message 121 and generate the action message 106. In a preferred embodiment, the action message 106 may be coupled to the environment 102 (e.g., a physical device or another software element) and may cause an effect in the environment 102. For example, the environment 102 may comprise a chess program and the action message 106 may direct the chess program to make a particular move on behalf of the agent 101.

In a preferred embodiment, the software agent 101 may be implemented with an automated processor 124, which may execute a software inference engine 125 for reasoning using a set of cases 126 in a case base 127 and a set of rules 128 in a rule base 129. In a preferred embodiment, the processor 124 may comprise a system having a processor, memory comprising a stored program, memory comprising data, and input/output devices, as is well known in the art. The operation and software structures of this system are described herein in terms of their functions and at a level of detail which would be clear to those of ordinary skill in the art. It would be clear to anyone of ordinary skill in the art, after perusal of the specification, drawings and claims herein, that modification and/or programming (using known programming techniques) of a processor of known design to achieve these functions would be a straightforward task and would not require undue experimentation.

In a preferred embodiment, the processor 124 may comprise an IBM-compatible PC configured to be able to execute the MicroSoft Windows 3.0 and DOS 3.1 software, and having a hard disk drive, a mouse, and a VGA display. At least a 286 processor with four megabytes of memory is preferred; a 386 processor with eight megabytes of memory is more preferred. The MicroSoft Windows 3.0 software is preferably executed in 386 enhanced mode.

Figure 2:
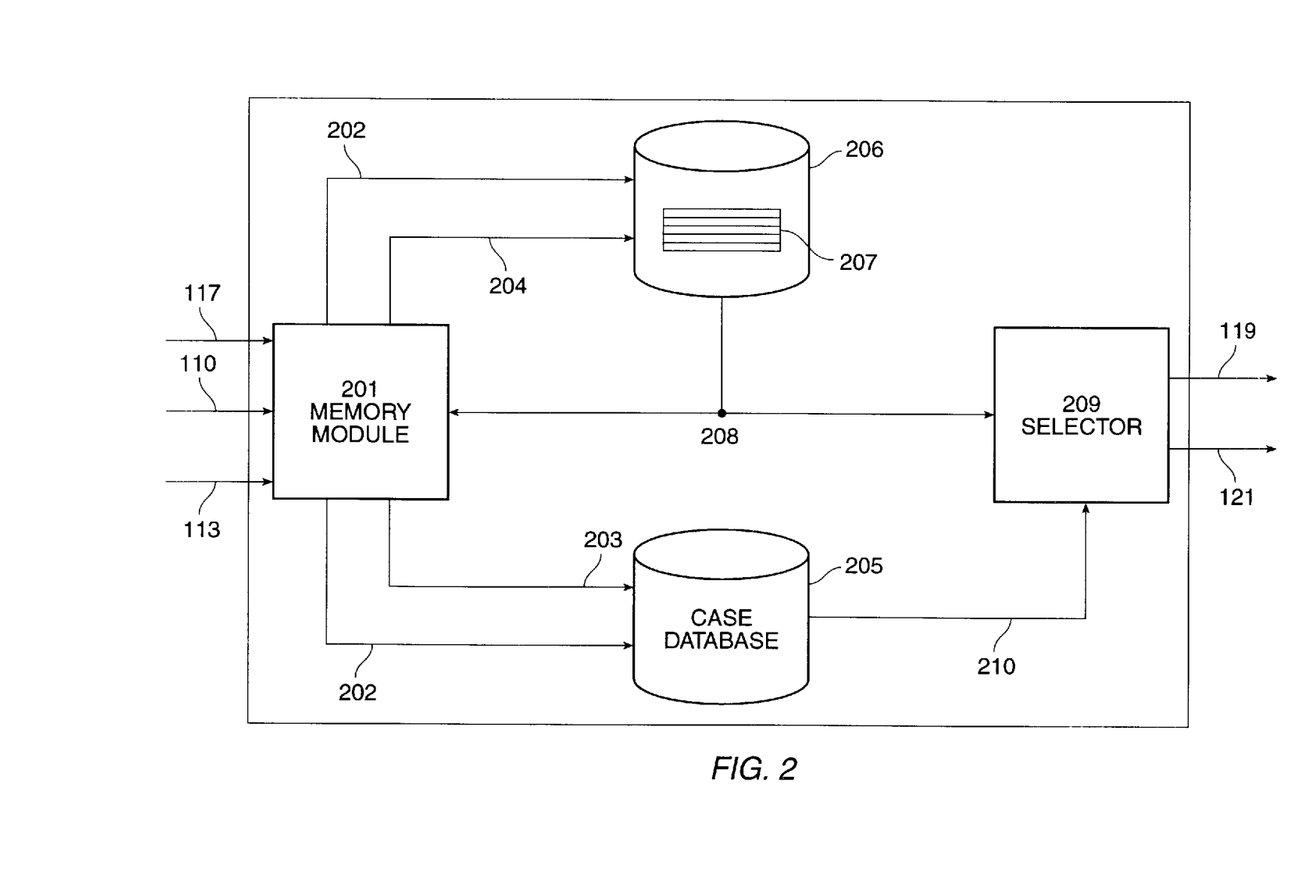
FIG. 2 shows a block diagram of a behavior module of an autonomous agent.

FIG. 2 shows a block diagram of a behavior module of an autonomous agent.

A memory module 201 may receive the motives message 117, the features message 110 and the reward message 113, and may generate a set of new cases 202, a set of case update messages 203, and a set of case retrieval messages 204. The new cases 202 may be transmitted to a case database 205 for storage, and to a case index 206 for indexing. In a preferred embodiment, aspects of a case-band reasoning system like that disclosed in related application, Ser. No. 08/247,630, filed May 23, 1994, now U.S. Pat. No. 5,581,664, which is a file wrapper continuation of a common parent application, Ser. No. 07/664,561, filed Mar. 4, 1991, consistent with the functions disclosed herein, may be used for case indexing and matching. The case database 205 may store the actual cases 126; the case index 206 may comprise a mapping from the features 111 to the cases 126 themselves.

Figure 3:
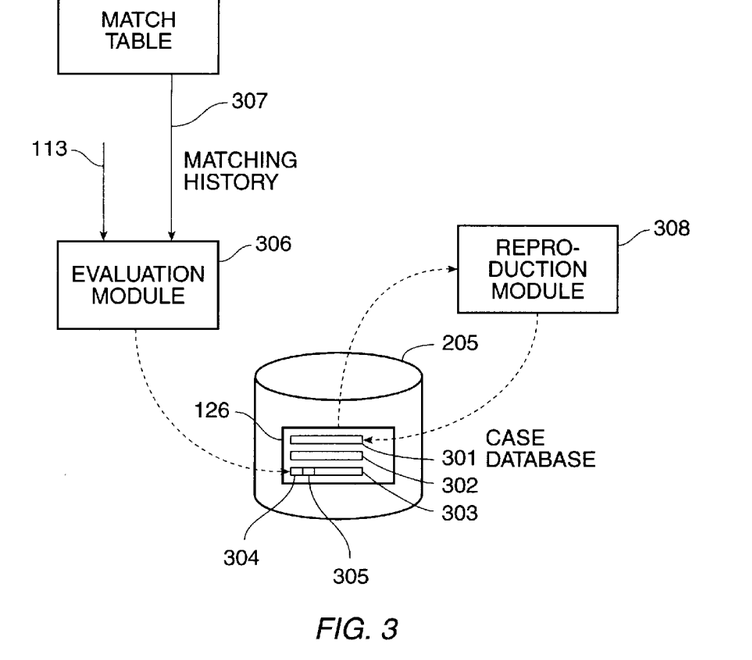
FIG. 3 shows a data flow diagram of a genetic technique for producing, evaluating and selecting cases.

In a preferred embodiment, the case database 205 may comprise a limited number of stored cases 126, the contents of the case database 205 being determined by a genetic technique for producing, evaluating and selecting the cases 126, such as a genetic technique like that disclosed with FIG. 3. Thus, while the case database 205 might store less than all of the cases 126 which the autonomous agent 101 has encountered, it might maintain a set of cases 126 which provides a preferred model of the environment, such as those cases 126 which allow the agent 101 to distinguish variant problem scenarios and to act autonomously and intelligently in those variant problem scenarios.

The case index 206 may comprise an index of the cases stored in the case database 205 (e.g., a set of case identifiers 207), organized so that cases 126 may be matched and retrieved, and may respond to the case retrieval message 204 by providing a matches message 208. The matches message 208 may comprise the case identifiers 207, and other information which a selector 209 may require.

The selector 209 may receive the matches message 208 and may also receive a cases message 210 from the case database 205, and may generate the queries message 119 and the commands message 121. In a preferred embodiment, the selector 209 may employ a technique for selecting cases like that disclosed with FIG. 4. The cases message 210 may comprise data from the cases 126, including evaluation data such as accuracy and utility values.

FIG. 3 shows a data flow diagram of a genetic technique for producing, evaluating and selecting cases.

The case database 205 may comprise its current set of cases 126, each of which may comprise a features element 301, which may generally indicate when the case 126 may be useful, and an action element 302, which may indicate the action 105 to take and an evaluation 303 of that action 105. In a preferred embodiment, the evaluation 303 may comprise an accuracy value 304, which may indicate how "good" the case 126 generally is when used, and a utility value 305, which may indicate how "often" the case 126 generally is usable. For example, if the environment 102 is a carpenter's bench, the utility value 305 of a hammer may be high, because it is often usable, even though its accuracy value 304 indicates that, even when the hammer is usable, it is not always the best choice. Similarly, the utility value 305 of a plane may be low, because it is only used in specialized situations, even though its accuracy value 304 indicates that whenever it is usable, it is the correct tool to choose.

An evaluation module 306 may receive the reward message 113 and a history message 307 (indicating the history of matches), and may operate on the cases 126 to adjust their weights 303, particularly their accuracy values 304 and their utility values 305. The evaluation module 306 may respond to the reward message 113 by altering the utility values 305 of the cases 126 to "reinforce" those cases 126 which correspond to the action which resulted in the reinforcement 114. Thus, rewards are "credited" to the cases 126 which earned them. Moreover, the evaluation module 306 may also alter the utility values 305 of those cases 126 which correspond to the action just previous to the reinforced action as well. Thus, rewards are also credited to the cases 126 which "led up to" them.

Additionally, the evaluation module may work with the memory module as follows. A case is generated which has not been encountered before. Then a set of matching cases is retrieved from the case base. The evaluation module may then evaluate the newly generated case in light of the matching cases. Thus, the evaluation module examines the weight of the cases in the case base as well as the cases themselves, and arrives at a recommended action. If the newly generated case represents a situation which has just been encountered in the environment, then reinforcement may be received from the environment or from the case base alone as to whether or not the recommended action was correct or accurate. The accuracy or inaccuracy of the evaluation (i.e., whether or not the recommended action was the correct one) may then be reflected in the case base by modifying the weights of the matching cases to reflect the accuracy or inaccuracy of the evaluation. Finally, cases in which the evaluation was inaccurate may be added into the case base.

In a preferred embodiment, the evaluation module 306 may alter the utility value 305 of each case 126 by adding the reinforcement 114 and the utility value 305 of the case 126 which is the "best match" for the next action. Thus:

utility value (time $t$)=reinforcement+utility value (time $t+1$)

A reproduction module 308 may operate on the cases 126 to adjust their features elements 301 or the action 105 in their action elements 302, by one or more of several techniques. For example, the reproduction module 308 may create and delete cases 126. The reproduction module 308 may create cases 126, for example by inserting new cases 126 into the case database 205 as they are encountered. One method for such instance-based learning is disclosed in related application, Ser. No. 08/247,630, filed May 23, 1994, now U.S. Pat. No. 5,581,664, which is a file wrapper continuation of a common parent application, Ser. No. 07/664,561, filed Mar. 4, 1991. The reproduction module 308 may delete cases 126, for example when their accuracy values 304 or their utility values 305 fall below a threshold.

The reproduction module 308 may also make new cases 126 from the old cases 126 in the case database 205. The reproduction module 308 may mutate cases 126, for example by altering one or more features 111 in one case 126 in the case database 205. The reproduction module 308 may also cross-pollinate cases 126, for example by selecting some features 111 from one old case 126 and some features 111 from another old case 126 to create one or more new cases 126.

The operation of the evaluation module 306 and the reproduction module 308 serve to continually review and update the selection of cases 126 in the case database 205, so that the case database 205 is continually altered into a progressively better set of cases 126. The genetic technique is influenced by the reward message 113, which provides a form of evolutionary pressure towards selection of those sets of cases 126 in the case database 205 which maximize rewards.

Figure 4:
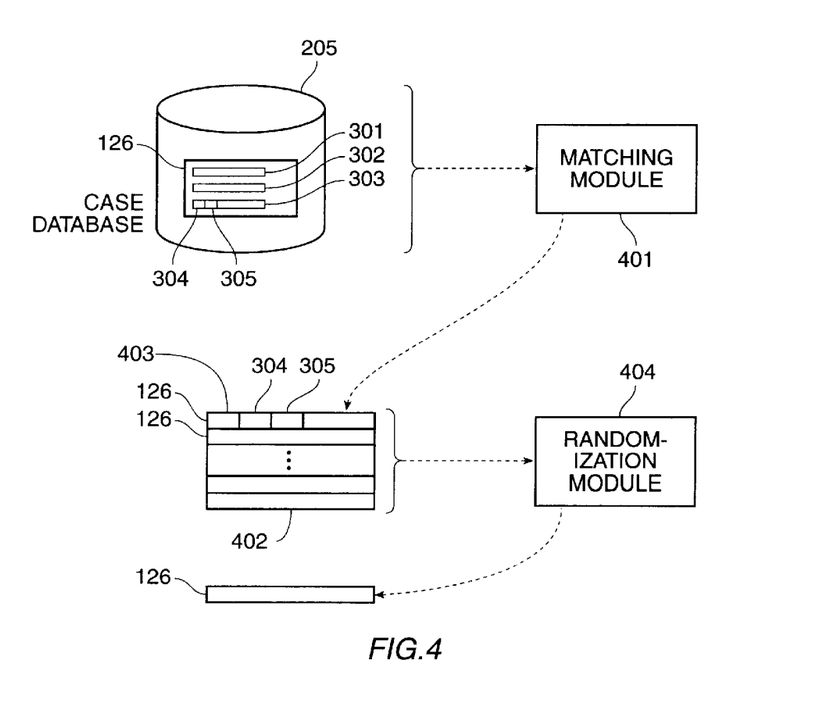
FIG. 4 shows a data flow diagram of a technique for selecting cases in a memory.

FIG. 4 shows a data flow diagram of a technique for selecting cases in a memory.

A matching module 401 may review the cases 126 in the case database 205 and may generate a match table 402. In a preferred embodiment, a technique for selecting cases 126 may employ techniques for matching features 111 such as attribute-value pairs, and for generating the match table 402, like those disclosed in related application, Ser. No. 08/247,630, filed May 23, 1994, now U.S. Pat. No. 5,581,664, which is a file wrapper continuation of a common parent application, Ser. No. 07/664,561, filed Mar. 4, 1991, consistent with the functions disclosed herein. The match table 402 may comprise a set of cases 126 (or indices of cases 126), each having a match quality value 403, the accuracy value 304 of that case 126, and the utility value 305 of that case 126.

A randomization module 404 may choose one of the cases 126 based on a random or pseudorandom effect. As used herein, "random" effects include pseudorandom effects and related methods which may be used to achieve similar results. In a preferred embodiment, the randomization module 404 may choose one of the cases 126 in the match table 402 with a probability of choice for each case 126 which is linearly proportional to its accuracy value 304. The cases 126 in the match table 402 are therefore chosen for matching based on their match quality values 403, but they are selected for action based on their accuracy values 304. This allows the technique for selection to encourage experimentation by the agent 101.

It would be clear to one of ordinary skill in the art, after perusal of the specification, drawings and claims herein, that the randomization module 404 may employ other and further techniques for choosing one of the cases 126 in the match table 402. For example, another weight associated with the cases 126 (such as their utility value 305), or a combination of values associated with the cases 126 might be employed in place of the accuracy value 304. Moreover, the probability of choice may be other than linearly proportional to the accuracy value 304. It would be clear to one of ordinary skill in the art that such other and further techniques would be workable, and are within the scope and spirit of the invention.

Figure 5:
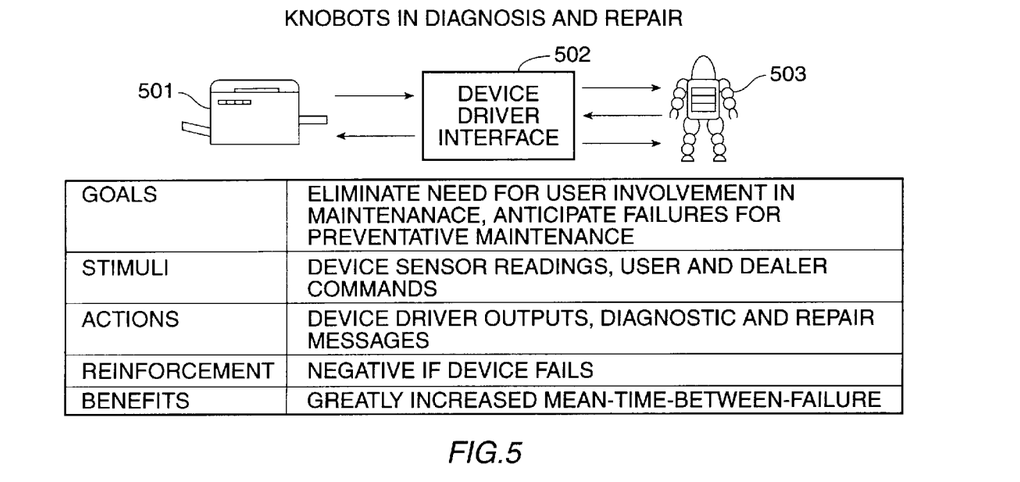
FIG. 5 shows a block diagram of an intelligent office equipment device including an autonomous agent.

FIG. 5 shows a block diagram of an intelligent office equipment device including an autonomous agent.

A device 501, such as a photocopier or printer, may be coupled to a device driver interface 502, which may be coupled to a control processor 503 including the autonomous agent 101. The device 501 may of course be one of many different devices, such as a fax machine, a modem, or a telephone.

The device driver interface 502 provides the stimulus message 104 to the control processor 503, which delivers the stimulus message 104 to the autonomous agent 101. The autonomous agent 101 generates the action message 106, which the control processor 503 delivers to the device driver interface 502.

The motives message 117 may reflect a set of goals, such as eliminating or reducing the need for user involvement in maintenance of the device 501, and to anticipate failures of the device 501 so that preventative maintenance may be performed so as to reduce failures and to increase mean-time-between-failure. The features message 110 may comprise sensor readings from the device 501, and commands from users and dealers. The action message 106 may comprise orders to the device driver interface 502 to alter settings on the device 501, and may also comprise messages to users and dealers such as diagnostic and repair messages. The reward message 113 may comprise a negative reinforcement 114 whenever the device 501 fails.

Figure 6:
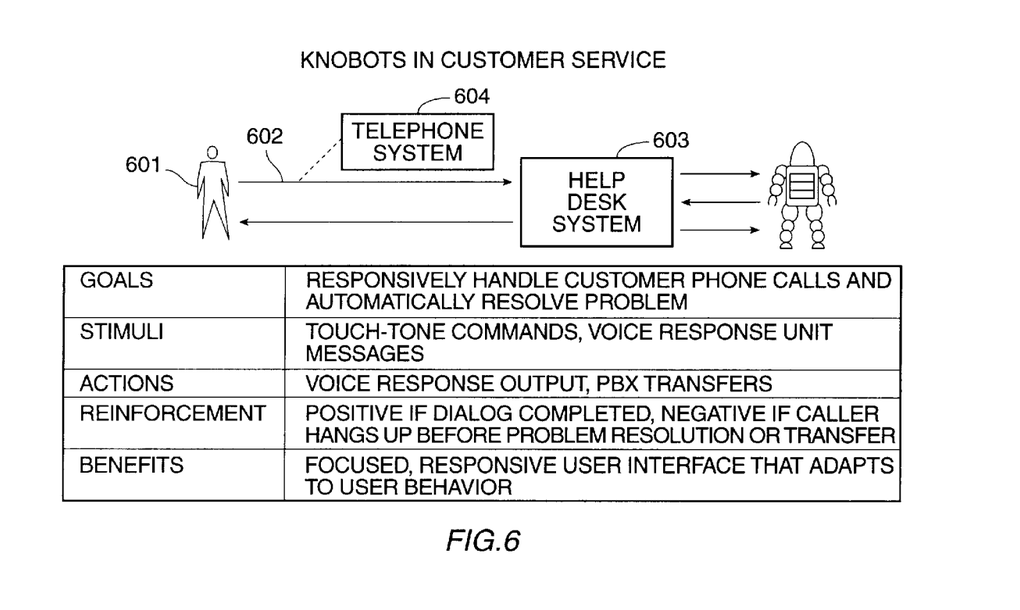
FIG. 6 shows a block diagram of a customer service system with a help-desk system including an autonomous agent.

FIG. 6 shows a block diagram of a customer service system with a help-desk system including an autonomous agent.

A user 601, such as a human being, may access the system by means of a telephone connection 602. A help-desk system 603 may attempt to respond to inquiries and resolve problems, with the aid of the autonomous agent 101. The help-desk system 603 provides the stimulus message 104 to the autonomous agent 101. The autonomous agent 101 generates the action message 106 for the help-desk system 603.

The help desk system 603, its purpose and operation, may be like that shown in related application, Ser. No. 08/247,630, filed May 23, 1994, now U.S. Pat. No. 5,581,664, which is a file wrapper continuation of a common parent application, Ser. No. 07/664,561, filed Mar. 4, 1991. It may receive touch-tone commands from the user 601 and may generate voice messages by means of voice response units; receiving touch-tone commands and generating voice messages are well known in the art.

The motives message 117 may reflect a set of goals, such as responding to user inquiries with appropriate information and properly resolving user problems, so as to provide an intelligent help-desk system 603 which focusses on the user problem and responds to that problem, and which adapts to user behavior. The features message 110 may comprise touch-tone commands from the user 601, data indicating voice response unit messages given to the user 601, and state information about the telephone connection 602. The action message 106 may comprise commands to the help-desk system 603 or commands to a telephone system 604 controlling the telephone connection 602 (e.g., to transfer the telephone connection 602 to a human operator).

The help-desk system 603 may consider that it has resolved the user problem when it reaches the end of its response or when it has transferred the telephone connection 602 to a human operator. The reward message 113 may comprise a positive reinforcement 114 when the help-desk system 603 resolves the user problem, and a negative reinforcement 114 whenever the telephone connection 602 is broken by the user 601 prior to that.

Figure 7:
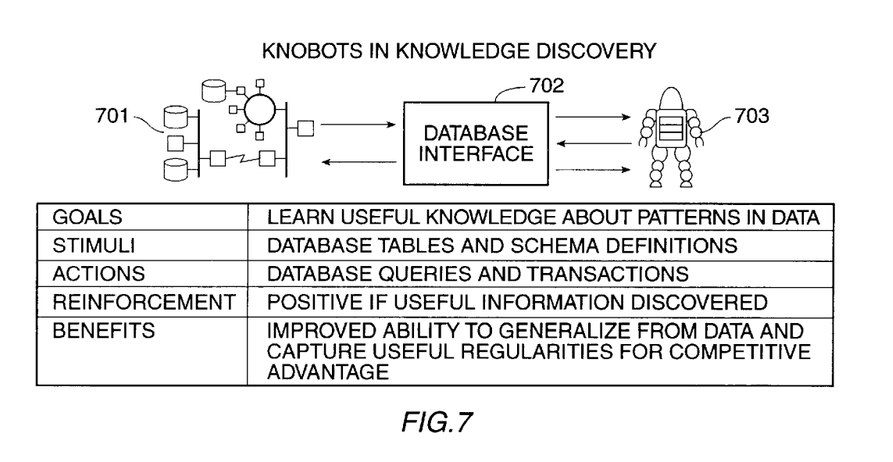
FIG. 7 shows a block diagram of a knowledge discovery system including an autonomous agent.

FIG. 7 shows a block diagram of a knowledge discovery system including an autonomous agent.

A knowledge database 701 may be coupled to a database interface 702, which may be coupled to a knowledge processor 703 including the autonomous agent 101. The knowledge database 701 may of course be one of many different types of databases, such as an object-oriented database or a relational database.

The database interface 702 provides the stimulus message 104 to the knowledge processor 703, which delivers the stimulus message 104 to the autonomous agent 101. The autonomous agent 101 generates the action message 106, which the knowledge processor 703 delivers to the database interface 702.

The motives message 117 may reflect a set of goals, such as discovering useful knowledge or patterns in the data in the knowledge database 701, so as to allow the autonomous agent 101 to generalize from data and to capture useful statements about regularities in the knowledge database 701. The features message 110 may comprise statements about data in the knowledge database 701, such as schema definitions or database tables. The action message 106 may comprise orders to the database interface 702 to alter or interrogate the knowledge database 701, such as database queries and transactions. The reward message 113 may comprise a positive reinforcement 114 whenever the autonomous agent 101 discovers "useful" information, for some predetermined definition of "useful" (e.g., an approval message from a human operator).

Alternative Embodiments

While preferred embodiments are disclosed herein, many variations are possible which remain within the concept and scope of the invention, and these variations would become clear to one of ordinary skill in the art after perusal of the specification, drawings and claims herein.

I claim:

1. In a case-based reasoning system, a method of altering a case base having a plurality of exemplar cases; said method comprising generating a case which has not been encountered before;

retrieving a set of matching cases from said case base;

evaluating said case in response to (a) said set of matching cases, or (b) said set of matching cases and a reinforcement received from an environment;

modifying weights of said set of matching cases to reflect the accuracy or inaccuracy of the evaluation; and selecting a limited set of cases in which the evaluation was inaccurate for addition into said case base which provides a preferred model of said environment.

* * * * *

UNITED STATES PATENT AND TRADEMARK OFFICE
CERTIFICATE OF CORRECTION

PATENT NO. : 5,852,814
DATED : December 22, 1998
INVENTOR(S) : Bradley P. Allen

It is certified that error appears in the above-identified patent and that said Letters Patent is hereby corrected as shown below:

In Column 5, line 41, please replace "case-band" with --case-based--.

Signed and Sealed this

Third Day of October, 2000

Attest:

Q. TODD DICKINSON

*Attesting Officer*                *Director of Patents and Trademarks*